No. 686,080. Patented Nov. 5, 1901.
M. JOYCE.
SAD IRON.
(Application filed May 16, 1901.)
(No Model.)
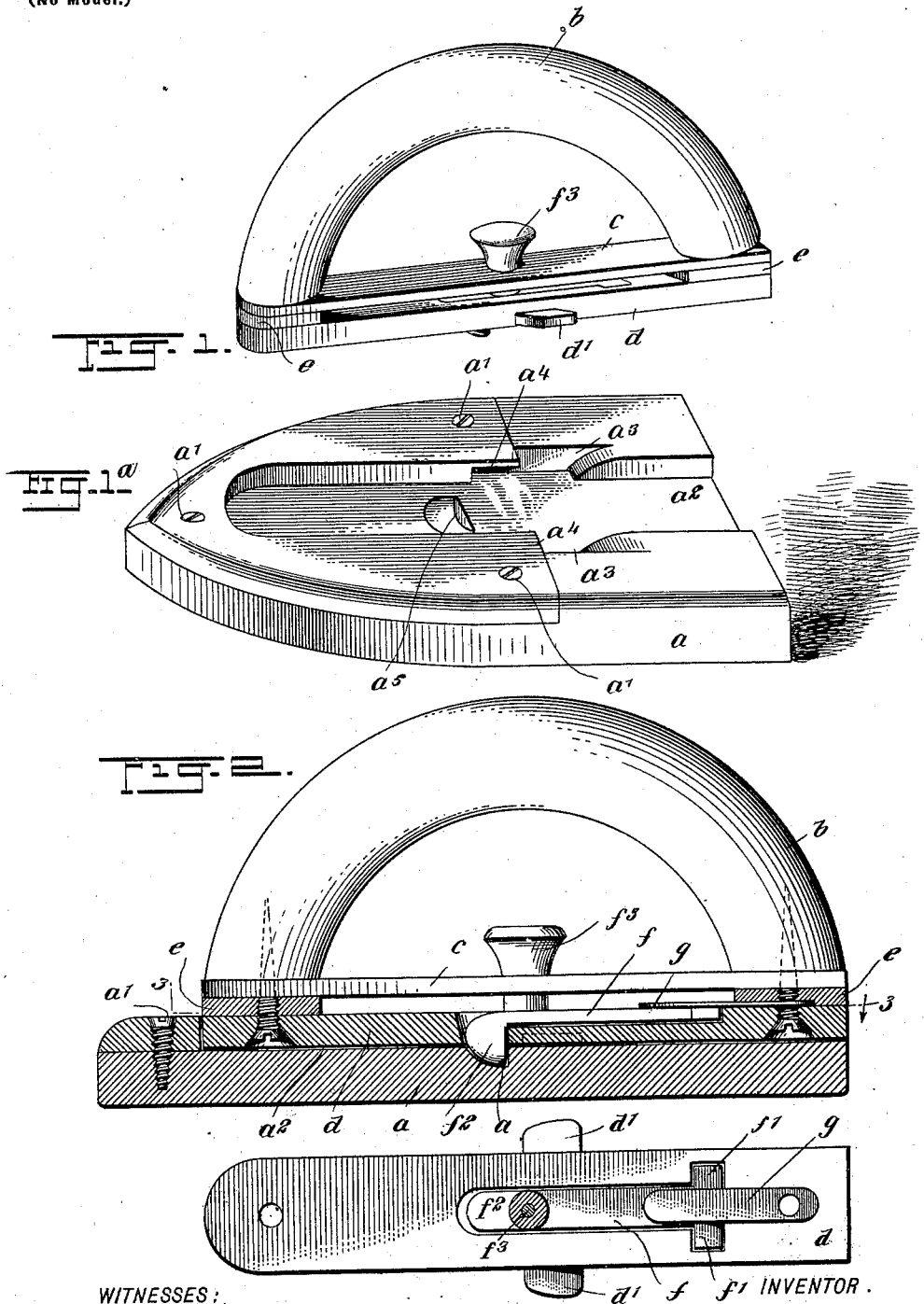
WITNESSES:
INVENTOR.
Michael Joyce
BY Munn & C
ATTORNEYS

UNITED STATES PATENT OFFICE.

MICHAEL JOYCE, OF SALT LAKE CITY, UTAH.

SAD-IRON.

SPECIFICATION forming part of Letters Patent No. 686,080, dated November 5, 1901.

Application filed May 16, 1901. Serial No. 60,456. (No model.)

*To all whom it may concern:*

Be it known that I, MICHAEL JOYCE, a citizen of the United States, and a resident of Salt Lake City, in the county of Salt Lake and State of Utah, have invented a new and Improved Sad-Iron, of which the following is a full, clear, and exact description.

This invention relates to a sad-iron having certain peculiar features of construction by means of which the handle may be attached to or detached from the iron at will, so that one handle will serve for a number of irons and need not be placed upon the fire with the irons when they are being heated.

This specification is a specific description of one form of the invention, while the claim is a definition of the actual scope thereof.

Reference is to be had to the accompanying drawings, forming a part of this specification, in which similar characters of reference indicate corresponding parts in all the views.

Figure 1 is a perspective view of the handle. Fig. 1$^a$ is a perspective view of the body of the iron. Fig. 2 is a longitudinal section of the invention, and Fig. 3 is a horizontal section looking down from the line 3 3 of Fig. 2 to show the lower of the two bars which are connected with the handle.

$a$ indicates the base of the iron, which is formed of metal, preferably in two horizontal plate-like sections of the form shown, fastened together by screws $a'$ or other suitable devices. In the top of the body $a$ of the iron a longitudinal groove $a^2$ is formed, and at the sides of this groove are formed recesses $a^3$, leading to undercut portions $a^4$. In the bottom of the groove $a^2$ a cavity $a^5$ is formed, which is located just forward of the undercut portions $a^4$.

The handle comprises a curved member $b$, forming the handle proper. Fastened to the ends of the handle proper are bars $c$ and $d$, which are spaced apart by non-heat-conducting blocks $e$. The bar $d$ is adapted to fit snugly in the groove $a^2$ and has lateral projections $d'$ at its sides. These projections $d'$ are capable of first entering the recesses $a^3$ and then of sliding forward into the undercut portions $a^4$, so as to lock the bar $d$ with the base of the sad-iron. The bar $d$ carries a dog $f$, which is set in a recess in the upper face of the bar $d$ and provided with lateral projections or trunnions $f'$ at its rear end, which form pivots whereon the dog swings. The nose of the dog (indicated at $f^2$ in Fig. 2) projects through an opening in the bar $d$ and is adapted to fit down in the cavity $a^5$ in the base $a$, thus locking the bar with its projections $d'$ in the undercut portions $a^4$. $g$ indicates a leaf-spring which is fastened to the bar $d$ and bears down on the dog $f$, holding it normally in the position shown in Fig. 2. $f^3$ indicates a thumb-knob which is attached to the dog and projects up through an opening in the bar $c$. The bar $d$ is formed of metal, preferably malleable iron, and the bar $c$ is formed of wood or some other non-conducting substance, so as to protect the hand from the heat of the iron and also to avoid burning the fingers when manipulating the knob $f^3$.

The use and advantages of this invention will be readily understood by persons skilled in the art and require no special description here.

Various changes in the form, proportions, and minor details of my invention may be resorted to without departing from the spirit and scope of my invention. Hence I consider myself entitled to all such variations as may lie within the scope of my claim.

Having thus described my invention, I claim as new and desire to secure by Letters Patent—

A sad-iron having a base provided on its upper surface with a longitudinal groove at each side of which is formed a recess having an undercut portion, the groove having a cavity in its bottom, a handle comprising a handle proper, a bar extending along the lower part thereof and capable of lying in the groove of the body, the bar having transverse projections adapted to enter the undercut portions of the aforesaid recesses, a dog mounted on the upper side of the bar and having its nose adapted to project through the bar below the same to engage in the cavity in the base, said dog having trunnions arranged to turn in recesses in the bar, and a spring pressing the dog into operative position.

In testimony whereof I have signed my name to this specification in the presence of two subscribing witnesses.

MICHAEL JOYCE.

Witnesses:
MARGARET STUART,
JENNIE EDWARDS.